US012594608B2

(12) United States Patent　　(10) Patent No.: US 12,594,608 B2
　　Koike et al.　　　　　　　　　　　(45) Date of Patent:　　Apr. 7, 2026

(54) CUTTING TOOL

(71) Applicant: Sumitomo Electric Industries, Ltd., Osaka (JP)

(72) Inventors: Yusuke Koike, Osaka (JP); Hiromitsu Kuriyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 532 days.

(21) Appl. No.: 18/265,968

(22) PCT Filed: Nov. 24, 2021

(86) PCT No.: PCT/JP2021/043000
　　§ 371 (c)(1),
　　(2) Date: Jun. 8, 2023

(87) PCT Pub. No.: WO2022/124078
　　PCT Pub. Date: Jun. 16, 2022

(65) Prior Publication Data
　　US 2024/0024959 A1　　Jan. 25, 2024

(30) Foreign Application Priority Data

Dec. 10, 2020　(WO) .................. PCT/JP2020/046111

(51) Int. Cl.
　　B23B 29/12　　　(2006.01)
　　B23Q 17/09　　　(2006.01)
(52) U.S. Cl.
　　CPC .............. B23B 29/12 (2013.01); B23Q 17/09 (2013.01); B23Q 17/0995 (2013.01);
　　　　　　　(Continued)

(58) Field of Classification Search
　　CPC .............. B23B 29/12; B23B 2260/128; B23B 2265/32; B23B 2270/48; B23C 2265/32;
　　　　　　　(Continued)

(56) References Cited

U.S. PATENT DOCUMENTS

2015/0261207 A1　9/2015　Wunderlich et al.
2016/0045994 A1　2/2016　Jayr et al.
　　　　　　(Continued)

FOREIGN PATENT DOCUMENTS

CN　　104139322 A　　11/2014
CN　　106112694 A　　11/2016
　　　　　(Continued)

*Primary Examiner* — Jermie E Cozart
(74) *Attorney, Agent, or Firm* — XSENSUS LLP

(57) ABSTRACT

A cutting tool includes a shaft, and a sensor device disposed in such a manner as to surround a portion of the shaft. The sensor device includes a sensor module including first sensors, a substrate connected to the first sensors, and a wireless communication unit connected to the substrate and configured to transmit a signal including information detected by the first sensors to outside and a housing accommodating the sensor module. A region of the shaft surrounded by the sensor device includes a first region having a shape of a 4n-sided polygon when viewed from a direction in which the rotation axis extends. The plurality of first sensors are arranged on at least two of outer peripheral surfaces of the first region, perpendicular lines of the outer peripheral surfaces passing through the rotation axis and intersecting at 90 degrees.

16 Claims, 14 Drawing Sheets

(52) U.S. Cl.
    CPC ..... *B23B 2260/128* (2013.01); *B23B 2265/32*
        (2013.01); *B23B 2270/48* (2013.01); *B23C*
        *2265/32* (2013.01); *B23Q 17/0909* (2013.01);
        *B23Q 17/0957* (2013.01); *B23Q 17/0966*
        (2013.01); *B23Q 17/0985* (2013.01)

(58) Field of Classification Search
    CPC ............ B23Q 17/0909; B23Q 17/0957; B23Q
        17/0966; B23Q 17/0985; B23Q 17/0995
    See application file for complete search history.

(56)                References Cited

U.S. PATENT DOCUMENTS

| | | | |
|---|---|---|---|
| 2016/0303698 A1 | 10/2016 | Takahashi et al. | |
| 2018/0178293 A1 | 6/2018 | Yamamoto et al. | |
| 2022/0324032 A1 | 10/2022 | Koike | |

FOREIGN PATENT DOCUMENTS

| | | | |
|---|---|---|---|
| CN | 109001996 | A | 12/2018 |
| CN | 110103076 | A | 8/2019 |
| EP | 2051041 | A2 | 4/2009 |
| EP | 3292929 | A1 | 3/2018 |
| EP | 3292930 | A1 | 3/2018 |
| JP | 2009-285804 | A | 12/2009 |
| JP | 2011-518048 | A | 6/2011 |
| JP | 3170029 | U | 9/2011 |
| JP | 2012-004490 | A | 1/2012 |
| JP | 2015-077658 | A | 4/2015 |
| JP | 2016-221665 | A | 12/2016 |
| JP | 2018-054611 | A | 4/2018 |
| JP | 2019-209420 | A | 12/2019 |
| JP | 2019-534795 | A | 12/2019 |
| WO | 2009/117396 | A2 | 9/2009 |
| WO | 2015/056495 | A1 | 4/2015 |
| WO | 2016/010411 | A1 | 1/2016 |
| WO | 2017/002762 | A1 | 1/2017 |
| WO | 2018/046304 | A1 | 3/2018 |
| WO | 2019/121189 | A1 | 6/2019 |
| WO | 2021/044989 | A1 | 3/2021 |

CUTTING TOOL

CROSS-REFERENCE TO RELATED APPLICATIONS

The present application is based on PCT filing PCT/JP2021/043000, filed Nov. 24, 2021, which claims priority to International Patent Application No. PCT/JP2020/046111, filed Dec. 10, 2020, the entire contents of each are incorporated herein by reference.

TECHNICAL FIELD

The present disclosure relates to a cutting tool.

BACKGROUND ART

There is known a technique for ascertaining a state of a cutting tool by measuring a physical quantity of the cutting tool by a sensor during machining by the cutting tool (for example, U.S. Patent Application Publication No. 2015/0261207 (PTL 1), Japanese Unexamined Patent Application Publication No. 2018-54611 (PTL 2), Japanese Unexamined Patent Application Publication No. 2009-285804 (PTL 3), WO 2017/002762 (PTL 4), Japanese Patent No. 5988066 (PTL 5), Utility Model Registration No. 3170029 (PTL 6), Japanese Unexamined Patent Application Publication No. 2015-77658 (PTL 7), WO 2015/056495 (PTL 8), European Patent Application Publication No. 3292929 (PTL 9) and European Patent Application Publication No. 3292930 (PTL 10)).

PRIOR ART DOCUMENT

Patent Literature

PTL 1: U.S. Patent Application Publication No. 2015/0261207
PTL 2: Japanese Unexamined Patent Application Publication No. 2018-54611
PTL 3: Japanese Unexamined Patent Application Publication No. 2009-285804
PTL 4: WO 2017/002762
PTL 5: Japanese Unexamined Patent Application Publication No. 2016-221665
PTL 6: Japanese Utility Model Registration No. 3170029
PTL 7: Japanese Unexamined Patent Application Publication No. 2015-77658
PTL 8: WO 2015/056495
PTL 9: European Patent Application Publication No. 3292929
PTL 10: European Patent Application Publication No. 3292930

SUMMARY OF INVENTION

A cutting tool according to the present disclosure includes a shaft extending along a rotation axis and having a first end portion and a second end portion, and a sensor device disposed in such a manner as to surround a portion of the shaft in a longitudinal direction of the shaft. The cutting tool is configured to cut a workpiece by rotating around the rotation axis of the shaft. The sensor device includes a sensor module including a plurality of first sensors configured to detect a first physical quantity of the shaft, a substrate electrically connected to the first sensors, and a wireless communication unit electrically connected to the substrate and configured to transmit a signal including information of the first physical quantity detected by the first sensors to outside and a housing accommodating the sensor module. A region of the shaft surrounded by the sensor device includes a first region having a shape of a 4n-sided polygon when viewed from a direction in which the rotation axis extends. The n is a natural number of two or more. When viewed from the direction in which the rotation axis extends, the plurality of first sensors are arranged on at least two of outer peripheral surfaces of the first region, each of the outer peripheral surfaces of the first region corresponding to one of sides of the 4n-sided polygon, perpendicular lines of the at least two outer peripheral surfaces passing through the rotation axis and intersecting each other at 90 degrees.

DESCRIPTION OF EMBODIMENTS

Figure 1:
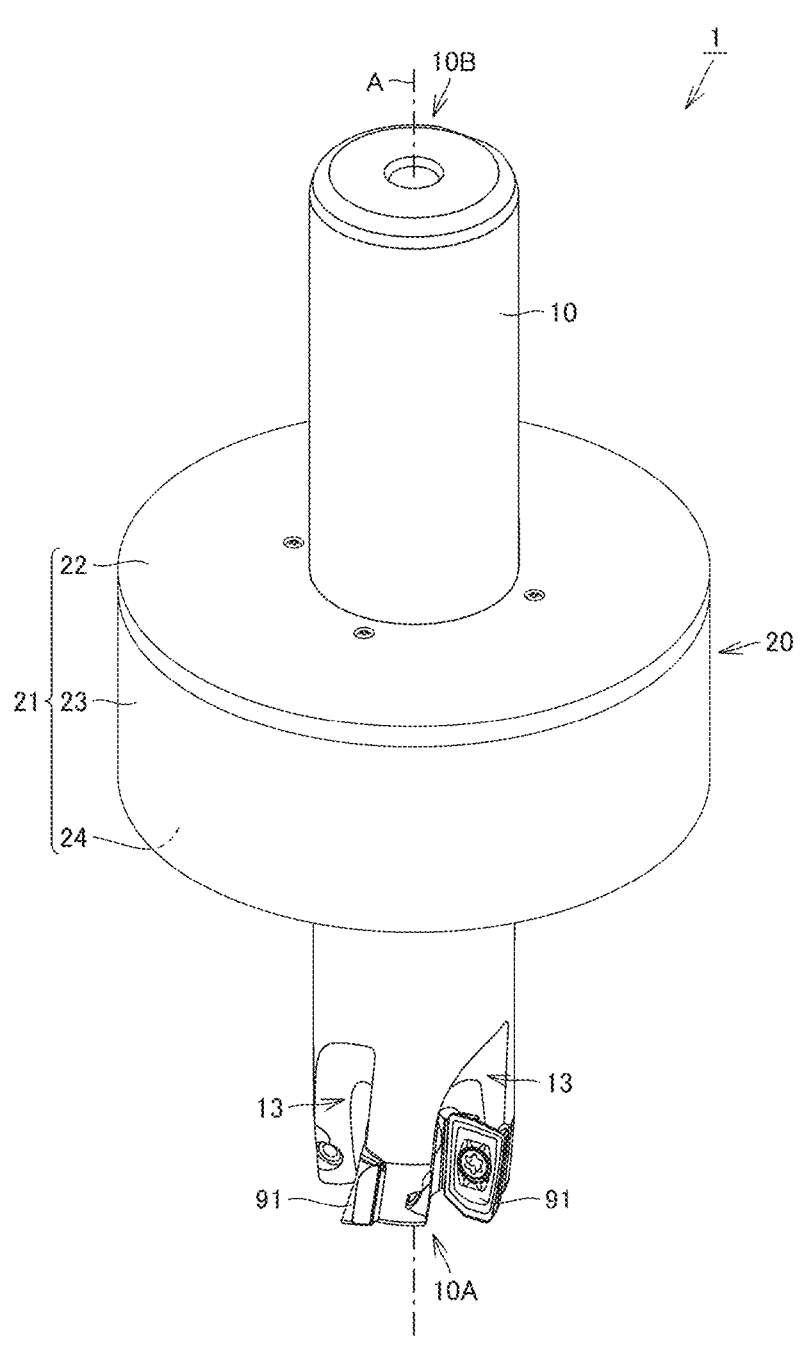
FIG. 1 is a schematic perspective view showing the structure of a cutting tool.

Problems to be Solved by Present Disclosure

From the viewpoint of ascertaining the state of the cutting tool in detail during machining, it is required to obtain more useful data by the sensor. It is an object of the present disclosure to provide a cutting tool in which more useful data can be obtained by the sensor.

Advantageous Effects of Present Disclosure

According to the cutting tool of the present disclosure, more useful data can be obtained by the sensor.

Description of Embodiments of Present Disclosure

First, embodiments of the present disclosure will be listed and explained. A cutting tool of the present disclosure includes a shaft extending along a rotation axis and having a first end portion and a second end portion, and a sensor device disposed in such a manner as to surround a portion of the shaft in a longitudinal direction of the shaft. The cutting tool is configured to cut a workpiece by rotating around the rotation axis of the shaft. The sensor device includes a sensor module including a plurality of first sensors configured to detect a first physical quantity of the shaft, a substrate electrically connected to the first sensors, and a wireless communication unit electrically connected to the substrate and configured to transmit a signal including information of the first physical quantity detected by the first sensors to outside and a housing accommodating the sensor module. A region of the shaft surrounded by the sensor device includes a first region having a shape of a 4n-sided polygon when viewed from a direction in which the rotation axis extends. The n is a natural number of two or more. When viewed from the direction in which the rotation axis extends, the plurality of first sensors are arranged on at least two of outer peripheral surfaces of the first region, each of the outer peripheral surfaces of the first region corresponding to one of sides of the 4n-sided polygon, perpendicular lines of the at least two outer peripheral surfaces passing through the rotation axis and intersecting each other at 90 degrees.

In the cutting tool of the present disclosure, a region of the shaft surrounded by the sensor device includes a first region having a shape of a 4n-sided polygon (n is a natural number of two or more) when viewed from a direction in which the rotation axis extends. A plurality of first sensors configured to detect the same physical quantity (first physical quantity) are arranged on at least two of outer peripheral surface of the first region each corresponding to one of sides of the 4n-sided polygon, perpendicular lines of the at least two outer peripheral surfaces passing through the rotation axis and intersecting each other at 90 degrees. In this way, sensors detecting the same physical quantity are arranged with a phase difference of 90 degrees in rotation about the rotation axis. As a result, the first physical quantity in the plane perpendicular to the rotation axis may be appropriately ascertained. The physical quantity ascertained in this way is useful for ascertaining the state of the cutting tool during machining. As described above, according to the cutting tool of the present disclosure, more useful data can be obtained by the sensor.

In the cutting tool, when viewed from the direction in which the rotation axis extends, angles formed by perpendicular lines of pairs of the outer peripheral surfaces of the first region, the perpendicular lines passing through the rotation axis, and each of the pairs corresponding to respective of the sides of the 4n-sided polygon that are adjacent to each other in a circumferential direction, are equal to each other. In this way, it becomes easy to ensure the symmetry of the outer peripheral surface of the first region where the sensor can be arranged with respect to the rotation axis.

In the cutting tool, the substrate may be disposed in such a manner as to extend along the outer peripheral surfaces of the first region corresponding to a plurality of sides of a 4n-sided polygon when viewed from the direction in which the rotation axis extends. In this way, it is easy to prevent the substrate module from moving relative to the shaft. As a result, the accuracy of the physical quantity obtained from the first sensor is increased.

In the cutting tool, a first recess may be formed in an outer peripheral surface of the shaft. Each of the first sensors may be accommodated in the first recess. In this way, this facilitates the arrangement of the first sensor.

In the cutting tool, the first sensors may be strain sensors. The sensor arrangement of the present disclosure is suitable for measuring strain.

In the cutting tool, a second recess may be formed in an outer peripheral surface of the shaft. Each of the first sensors may be arranged in such a manner as to straddle the second recess. In a case where the first sensor is a strain sensor, by arranging the first sensor so as to straddle the second recess as described above, strain can be easily measured with high accuracy.

In the cutting tool, the first sensors may be strain sensors. An outer peripheral surface of the shaft may have a first recess and a second recess, the second recess being deeper than the first recess and overlapping the first recess. Each of the first sensors may be arranged in such a manner as to straddle the second recess and accommodated in the first recess. With this configuration, the first sensor can be easily arranged and the strain can be easily measured with high accuracy by the first sensor.

In the above cutting tool, the second recess may be a groove extending in a circumferential direction of the shaft. The first recess may extend in direction perpendicular to the second recess. With this configuration, the first sensor can be easily arranged and the strain can be more easily measured with high accuracy by the first sensor.

In the cutting tool, the first sensor may be acceleration sensors. The sensor arrangement of the present disclosure is suitable for measuring acceleration.

In the cutting tool, the sensor module may further include a plurality of second sensors configured to detect a second physical quantity of the shaft different from the first physical quantity of the shaft. The substrate may be electrically connected to the second sensors. The wireless communication unit may be electrically connected to the substrate and configured to transmit a signal including information of the second physical quantity detected by the second sensors to outside.

As described above, by arranged the second sensor that detects the second physical quantity different from the first physical quantity, two types of physical quantities can be ascertained at the same time. As a result, the sensor can obtain more useful data for ascertaining the state of the cutting tool during machining.

In the above cutting tool, the first sensors may be strain sensors configured to detect strain as the first physical quantity. The second sensors may be acceleration sensors configured to detect acceleration as the second physical quantity. In this way, the strain and acceleration of the cutting tool can be ascertained simultaneously.

In the cutting tool, the first sensors and the second sensors may be arranged on the outer peripheral surfaces of the first region, and the outer peripheral surfaces on which the first sensors are arranged correspond to the sides of the 4n-sided polygon different from the sides of the 4n-sided polygon that the outer peripheral surfaces on which the second sensors are arranged. In this way, this facilitates the arrangement of the sensor.

In the above cutting tool, the sensor module further may include a wiring line connected to the first sensor. The wiring line may be configured to connect the first sensors to the substrate with slack in the wiring line. As described above, the first sensor can be easily arranged without adjusting the length of the wiring line by allowing the wiring line of the first sensor to have slack.

In the cutting tool, the sensor module may further include an AD converter disposed on the substrate. In a fourth region that may be different from a second region in which the wireless communication unit is placed and a third region in which the AD converter is placed, a thickness of the substrate is smaller than a thickness of the substrate in the second region and smaller than a thickness of the substrate in the third region, the substrate being bent in the fourth region. With this configuration, it is possible to facilitate deformation of the substrate for installation while preventing the wireless communication unit and the AD converter, which are relatively large components, from being peeled off due to deformation of the substrate.

In the above cutting tool, the substrate may be a rigid substrate. A groove may be formed in the fourth region of the substrate, the groove connecting both ends of the substrate in the direction in which the rotation axis extends. With this configuration, it becomes easy to make the thickness of the fourth region smaller than the thicknesses of the second region and the third region.

In the cutting tool, the substrate may include a main body being a flexible substrate and reinforcing plates disposed in the second region and the third region, each of the reinforcing plates having a Young's modulus higher than a Young's modulus of the main body. With this configuration, it becomes easy to make the thickness of the fourth region smaller than the thickness of the second region and the third region.

Details of Embodiments of Present Invention

Embodiments of a cutting tool according to the present disclosure will be described below with reference to the drawings. In the following drawings, the same or corresponding portions are denoted by the same reference numerals, and description thereof will not be repeated.
(Outline of Structure of Cutting Tool)

FIG. 1 is a schematic perspective view showing the structure of a cutting tool. First, the structure of the cutting tool will be schematically described with reference to FIG. 1. A cutting tool 1 according to the present embodiment includes a shaft 10 and a sensor device 20. Shaft 10 extends along a rotation axis A from a first end portion 10A to a second end portion 10B. Sensor device 20 is arranged to surround a portion of the longitudinal direction of shaft 10. In shaft 10, a plurality of recesses 13 (four recesses 13 in this case) which are open in first end portion 10A and the outer peripheral surface are formed at equal intervals in the circumferential direction. A cutting insert 91 is attached to the wall defining recess 13. A workpiece (not shown) may be machined by rotating cutting tool 1 around rotation axis A to bring cutting insert 91 into contact with the workpiece. That is, cutting tool 1 is a cutting tool that cuts a workpiece by rotating around rotation axis A of shaft 10.
(Structure of Shaft)

Figure 2:
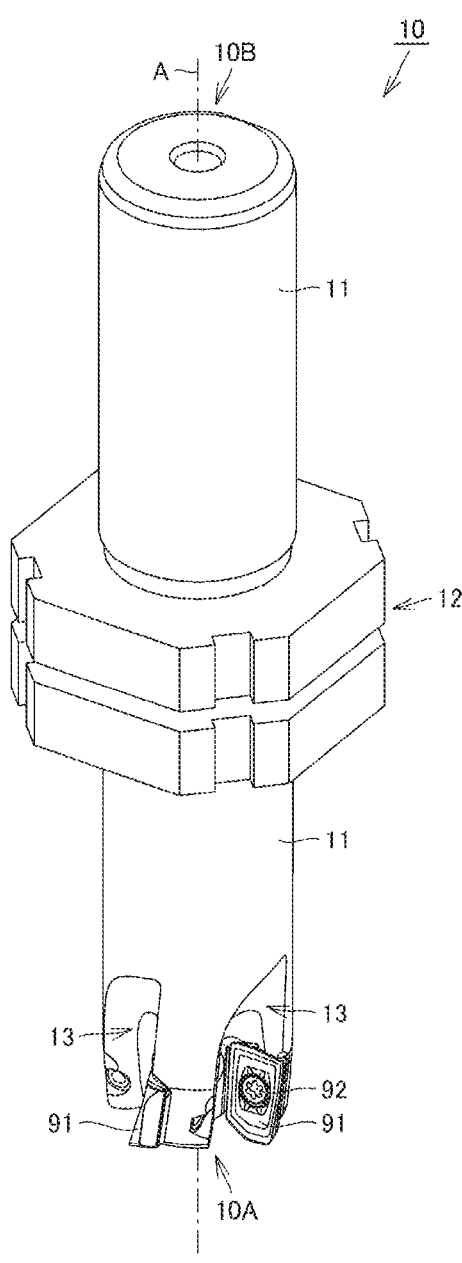
FIG. 2 is a schematic perspective view showing the structure of the shaft.
Figure 3:
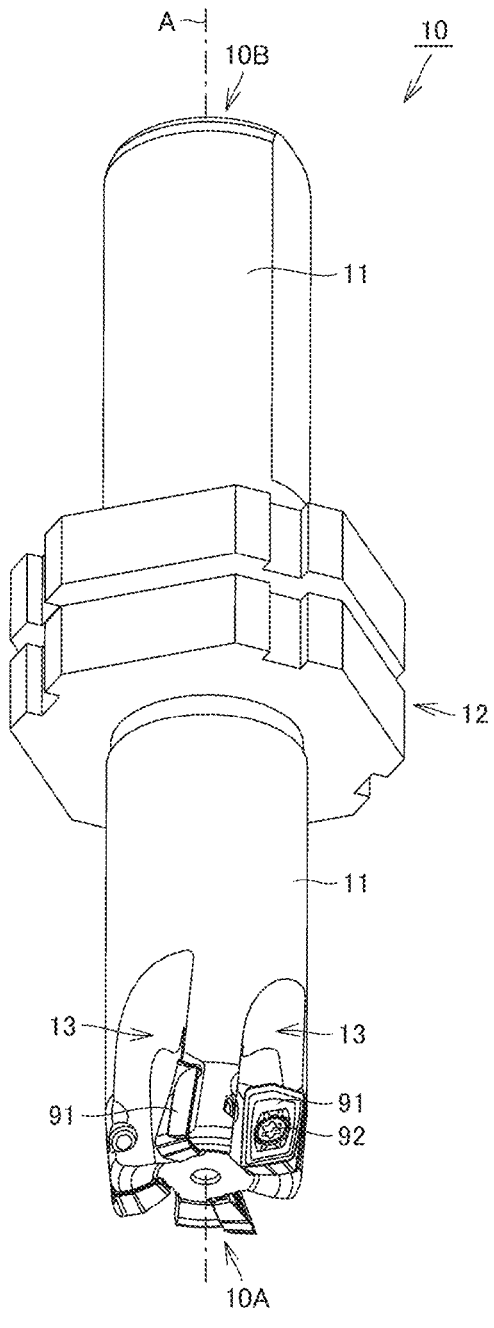
FIG. 3 is a schematic perspective view showing the structure of the shaft viewed from a different point of view from FIG. 2.
Figure 4:
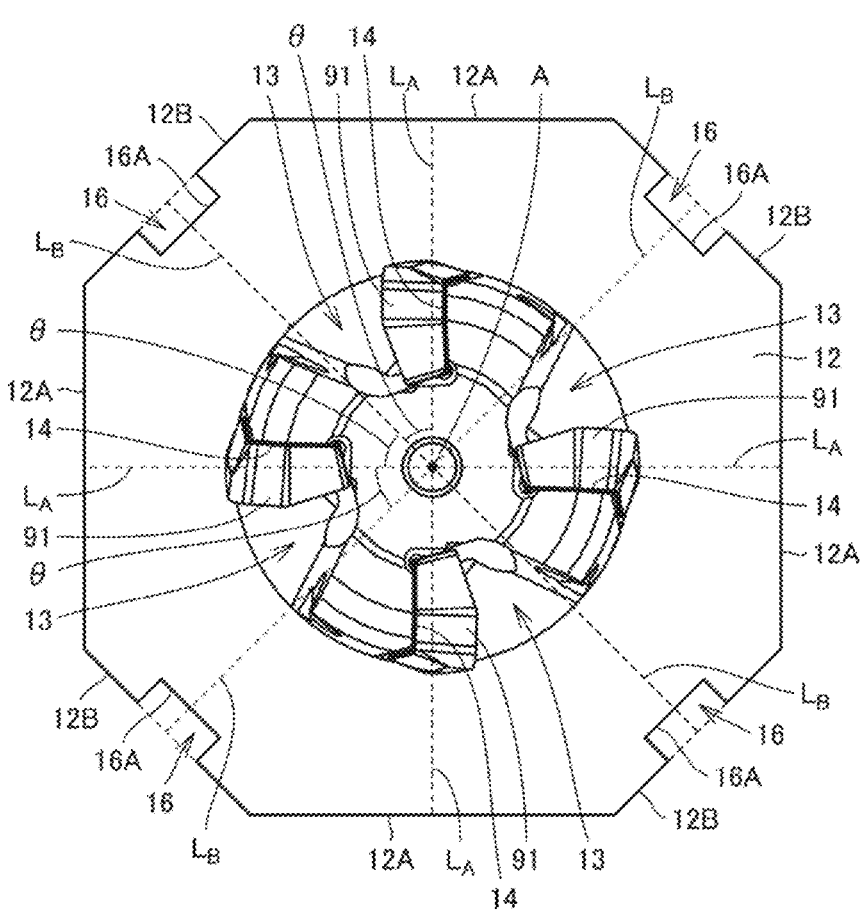
FIG. 4 is a schematic plan view showing the structure of the shaft viewed from the first end portion side in the rotation axis direction.
Figure 5:
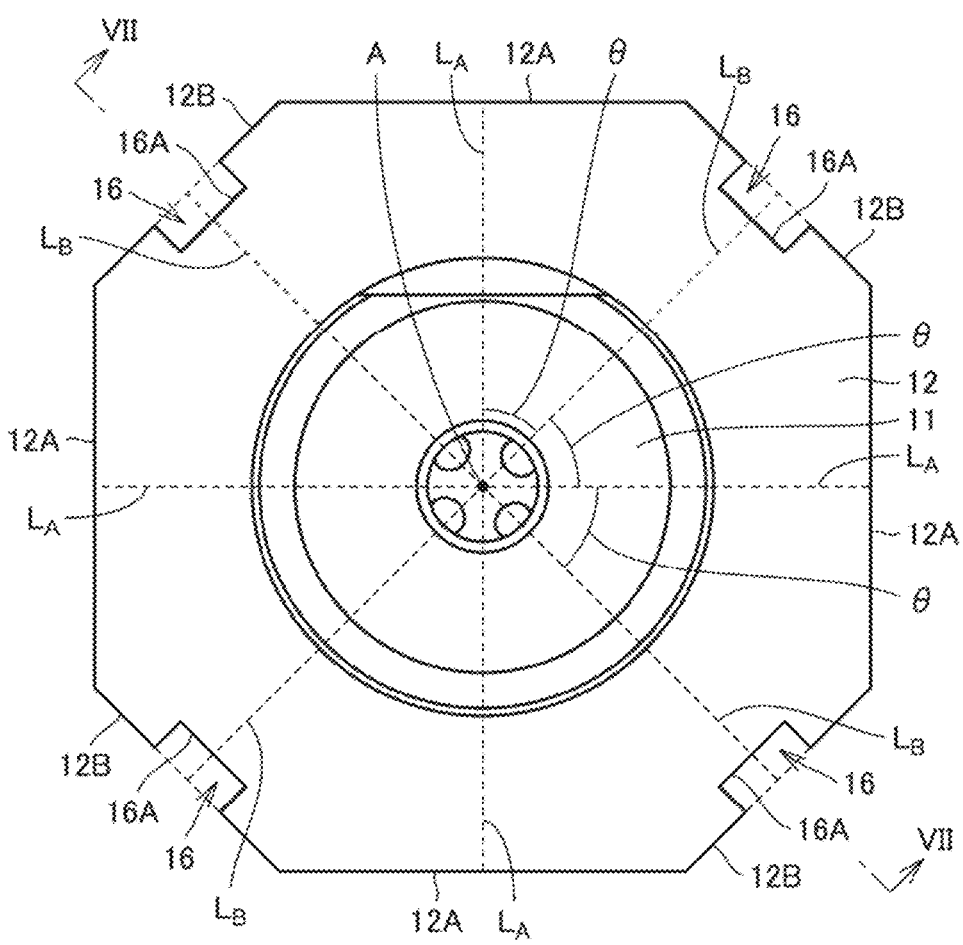
FIG. 5 is a schematic plan view showing the structure of the shaft viewed from the second end portion side in the rotation axis direction.
Figure 6:
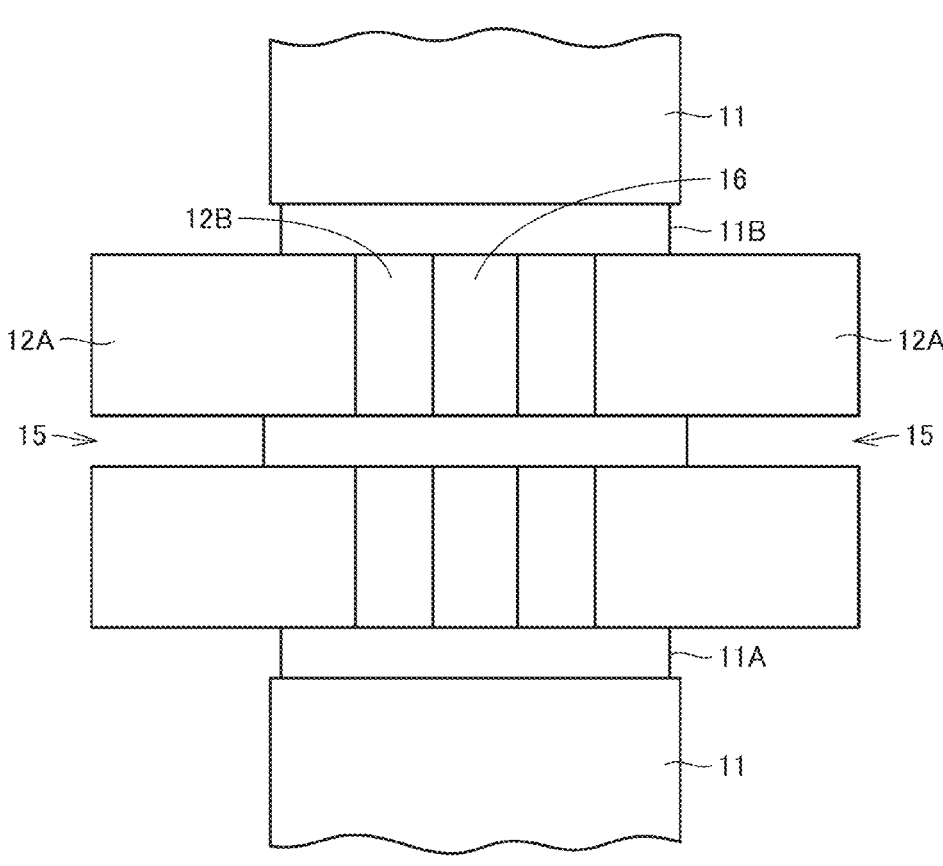
FIG. 6 is a schematic plan view showing the structure of the shaft viewed in a direction perpendicular to the axial direction.
Figure 7:
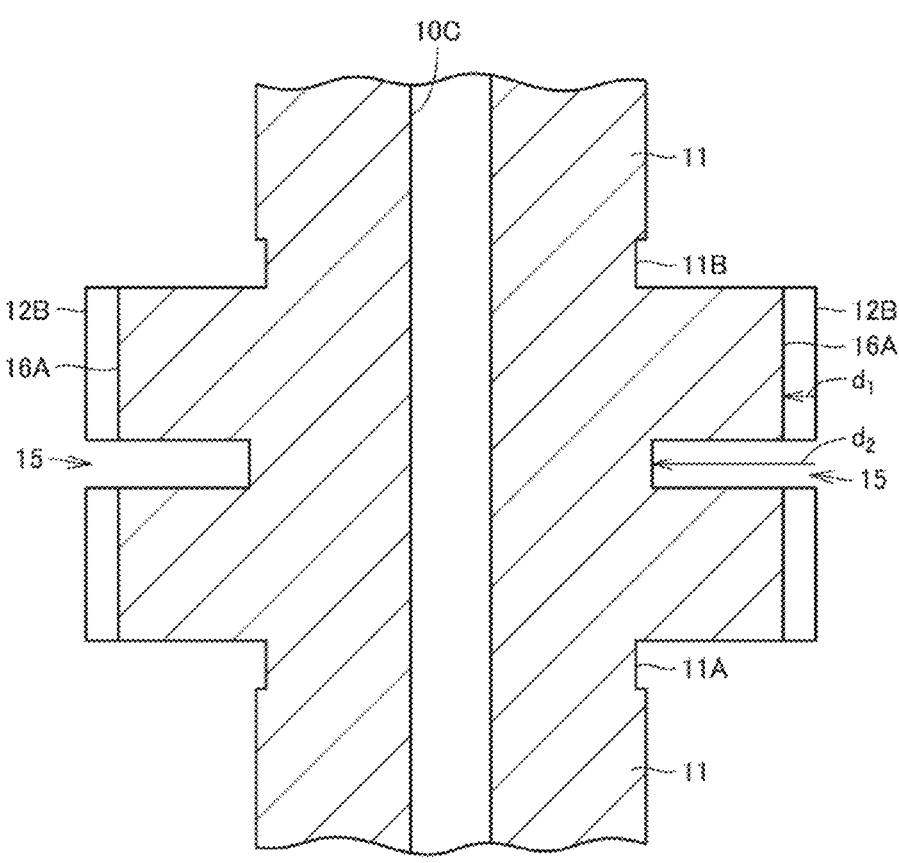
FIG. 7 is a schematic cross-sectional view showing a cross section taken along line VII-VII of FIG. 5.

Details of each part of the cutting tool will now be described. FIG. 2 is a schematic perspective view showing the structure of the shaft viewed from second end portion 10B. FIG. 3 is a schematic perspective view showing the structure of the shaft viewed from first end portion 10A. FIG. 4 is a schematic plan view showing the structure of the shaft viewed from the first end portion in the rotation axis direction. FIG. 5 is a schematic plan view showing the structure of the shaft viewed from the second end portion in the rotation axis direction. FIG. 6 is a schematic plan view showing the structure of the shaft viewed in a direction perpendicular to the axial direction. FIG. 7 is a schematic cross-sectional view showing a cross section taken along line VII-VII of FIG. 5. The structure of shaft 10 will be described with reference to FIGS. 2 to 7.

Referring to FIGS. 2 and 3, shaft 10 includes a main body 11 and an increased-diameter portion 12 as a first region. Main body 11 has a cylindrical shape. Rotation axis A coincides with the central axis of main body 11. Increased-diameter portion 12 is a portion having a larger diameter than main body 11. Although the position of increased-diameter portion 12 in the longitudinal direction of main body 11 is not particularly limited, in the present embodiment, increased-diameter portion 12 is disposed at the central portion in the longitudinal direction of main body 11. Increased-diameter portion 12 is disposed in a region of shaft 10 which is surrounded by sensor device 20.

Referring to FIGS. 2 to 4, as described above, cutting insert 91 is attached to the wall surface defining recess 13 of shaft 10. Cutting insert 91 is fixed to shaft 10 by inserting and tightening a screw 92 into a screw hole formed in cutting insert 91.

Referring to FIGS. 2 to 6, increased-diameter portion 12 has a shape of an octagonal prism. Referring to FIGS. 4 and 5, increased-diameter portion 12 has an octagonal shape when viewed from a direction in which the rotation axis A extends. More specifically, increased-diameter portion 12 has, in a cross-section perpendicular to rotation axis A, the shape of an octagon obtained by removing four isosceles right triangles with the same shape from each of the four corners of a square. Rotation axis A passes through the center of gravity of the octagon. This octagonal shape is the same in the direction in which rotation axis A extends. A central axis of main body 11 and a central axis of increased-diameter portion 12 coincide with each other. Here, the central axis of increased-diameter portion 12 means a straight line passing through the center of gravity of the octagon.

Referring to FIGS. 4 and 5, when viewed in the direction in which the rotation axis A extends, the octagon is formed by an outer peripheral surface 12A corresponding to a long side and an outer peripheral surface 12B corresponding to a short side shorter than the long side. The long sides and the short side are alternately arranged. Angles $\theta$ formed by perpendicular lines $L_A$ and $L_B$ of pairs of outer peripheral surfaces 12A and 12B of increased-diameter portion 12 are equal to each other, perpendicular lines $L_A$ and $L_B$ passing through rotation axis A, and each of the pairs corresponding to two of the sides of the octagon that are adjacent to each other in the circumferential direction. Specifically, angle $\theta$ is 45 degrees. Note that the shape of the octagon is not limited to the shape described above, and the lengths of outer peripheral surface 12A and outer peripheral surface 12B may be the same when viewed in the direction in which the rotation axis A extends.

Referring to FIGS. 2 to 6, a first recess 16, extending in the direction in which rotation axis A extends, is formed in each outer peripheral surface 12B. A bottom surface 16A defining first recess 16 is planar. First recess 16 is disposed at a position crossing perpendicular line $L_B$. First recess 16 extends through outer peripheral surface 12B in the direction in which rotation axis A extends. A second recess 15, extending in the circumferential direction of increased-diameter portion 12, is formed in outer peripheral surfaces 12A, 12B of increased-diameter portion 12. Second recess 15 is formed so as to overlap first recess 16. Second recess 15 intersects (is orthogonal to) first recess 16. Second recess 15 is formed over the entire circumference of outer peripheral surfaces 12A, 12B of increased-diameter portion 12. That is, second recess 15 is formed in an annular shape.

Referring to FIGS. 6 and 7, a depth $d_2$ of second recess 15 is greater than a depth $d_1$ of first recess 16. A first small-diameter portion 11A having a smaller diameter than other portions is formed at a boundary portion near first end portion 10A between main body 11 and increased-diameter portion 12. A second small-diameter portion 11B having a smaller diameter than other portions is formed at a boundary portion near second end portion 10B between main body 11 and increased-diameter portion 12. A through hole 10C penetrating through shaft 10 in the direction in which rotation axis A extends is formed in shaft 10. Through hole 10C extends to include rotation axis A.

(Structure of Sensor Device)

Figure 8:
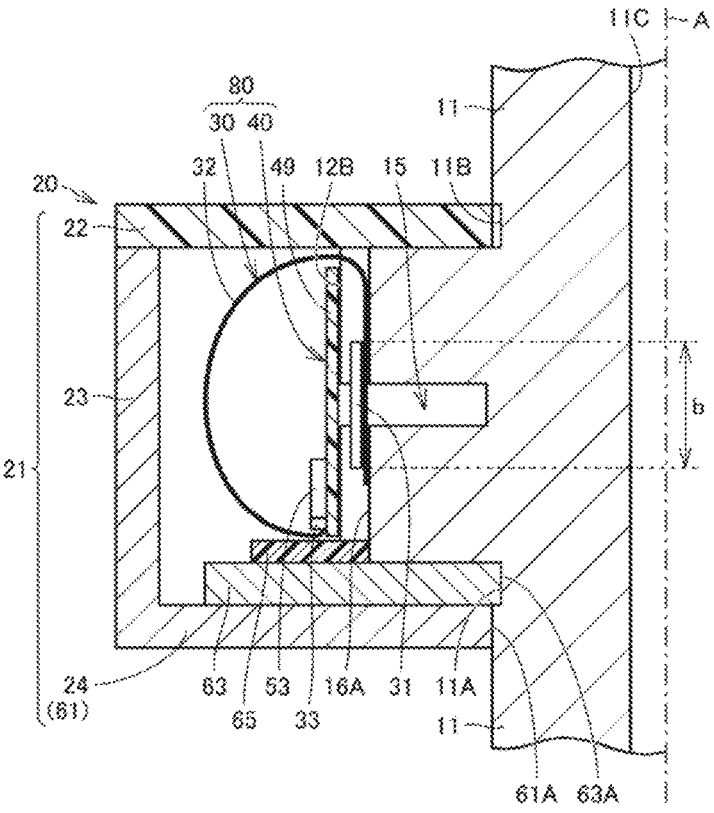
FIG. 8 is a schematic cross-sectional view showing a structure in the vicinity of the sensor device.

Next, the structure of sensor device 20 will be described with reference to FIGS. 8 to 16. Referring to FIG. 8, sensor device 20 includes a sensor module 80 and a housing 21 for accommodating sensor module 80. Sensor module 80 includes a plurality of strain sensors 31 as a plurality of first sensors, a substrate 49 electrically connected to strain sensors 31, and a wireless communication unit 51 (see FIGS. 10 and 11) electrically connected to substrate 49. Strain sensor 31 detects strain as a first physical quantity of shaft 10. Wireless communication unit 51 transmits a signal including information on the strain detected by strain sensor 31 to the outside.

Figure 9:
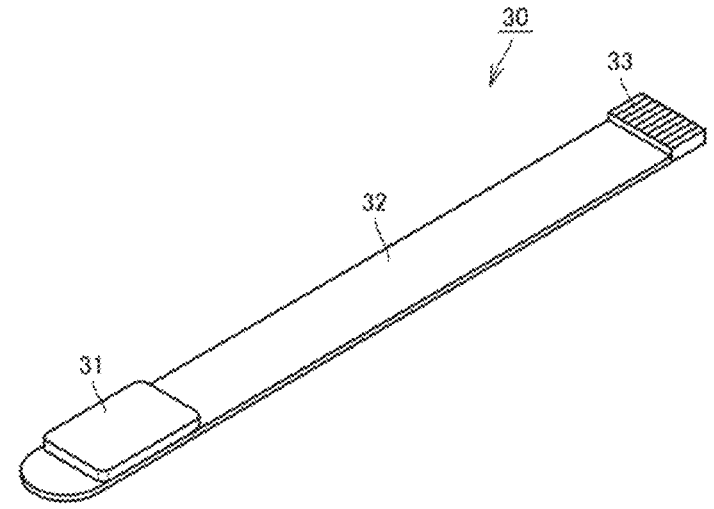
FIG. 9 is a schematic perspective view showing the structure of the strain sensor component.

Referring to FIG. 9, strain sensor 31 constitutes a strain sensor component 30. Strain sensor component 30 includes strain sensor 31 and a wiring line 32 which is connected to strain sensor 31 and has a connector 33 at its tip. Wiring line 32 has a belt-like shape. Strain sensor 31 is arranged near one end of wiring line 32. Connector 33 is disposed at the other end of wiring line 32.

Figure 10:
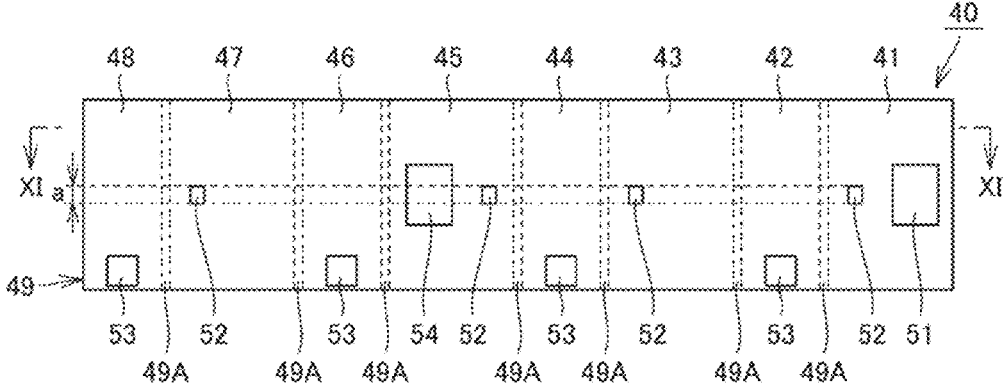
FIG. 10 is a schematic plan view showing the structure of a substrate module.
Figure 11:
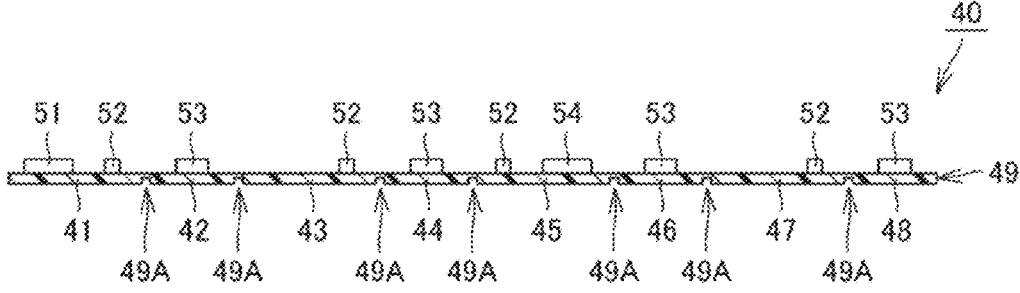
FIG. 11 is a schematic cross-sectional view showing a cross section taken along line XI-XI of FIG. 10.

Referring to FIGS. 10 and 11, substrate 49 constitutes a substrate module 40. Substrate 49 includes a substrate main body made of an insulator such as resin and a circuit pattern (not shown) made of a conductor such as copper formed on the surface of the substrate main body. Substrate module 40 includes substrate 49, wireless communication unit 51, acceleration sensors 52 as second sensors, sockets 53, and an AD converter 54. Wireless communication unit 51, acceleration sensors 52, sockets 53, and AD converter 54 are disposed on one main surface of substrate 49 and are electrically connected to substrate 49 (the circuit pattern of substrate 49). Acceleration sensors 52 detects an acceleration as a second physical quantity of shaft 10. A plurality of acceleration sensors 52 are arranged on substrate 49. Wireless communication unit 51 is electrically connected to acceleration sensor 52 via substrate 49. Wireless communication unit 51 transmits a signal including information on the acceleration of shaft 10 detected by acceleration sensors 52 to the outside.

Substrate 49 is a rigid substrate. Substrate 49 has a belt-like shape. Substrate 49 includes a first area 41, a second area 42, a third area 43, a fourth area 44, a fifth area 45, a sixth area 46, a seventh area 47, and an eighth area 48. First area 41 to eighth area 48 are arranged in this order in the longitudinal direction of substrate 49. Wireless communication unit 51 and acceleration sensor 52 are mounted on first area 41. Sockets 53 are mounted on second area 42. Acceleration sensor 52 are mounted on third area 43. Socket 53 is mounted in fourth area 44. Acceleration sensor 52 and AD converter 54 are mounted in fifth area 45. Socket 53 is mounted on sixth area 46. Acceleration sensor 52 is mounted in seventh area 47. Socket 53 is mounted in eighth area 48.

A bendable region 49A having a smaller thickness than other portions is formed between first area 41 to eighth area 48 adjacent to each other. Bendable region 49A is a groove connecting both ends of substrate 49 in a width direction (a direction perpendicular to a longitudinal direction). First area 41 is a second area in which wireless communication unit 51 is mounted. Fifth area 45 is a third area in which AD converter 54 is mounted. Bendable region 49A is a fourth region having a smaller thickness than the second region and the third region. The lengths of first area 41, third area 43, fifth area 45 and seventh area 47 in the longitudinal direction of substrate 49 correspond to the length of outer peripheral surface 12A which is the long side of the octagon when increased-diameter portion 12 is viewed from the direction in which rotation axis A extends. The lengths of second area 42, fourth area 44, sixth area 46 and eighth area 48 in the longitudinal direction of substrate 49 correspond to the length of outer peripheral surface 12B which is the short side of the octagon when increased-diameter portion 12 is viewed from the direction in which rotation axis A extends.

Next, the arrangement of strain sensor component 30 and substrate module 40 on shaft 10 will be described. Strain sensor component 30 is arranged such that strain sensor 31 spans second recess 15 and strain sensor 31 is accommodated in first recess 16 (see FIGS. 2, 4, 8, etc.). Strain sensor component 30 is arranged on each of four outer peripheral surfaces 12B. As a result, when viewed from the direction in which rotation axis A extends, strain sensor 31 is arranged on each of all outer peripheral surfaces 12B (outer peripheral surfaces corresponding to the short sides) of increased-diameter portion 12, each of outer peripheral surfaces of increased-diameter portion 12 corresponding to one side of the octagon, perpendicular lines $L_B$ passing through rotation axis A and intersecting each other at 90 degrees.

Figure 12:
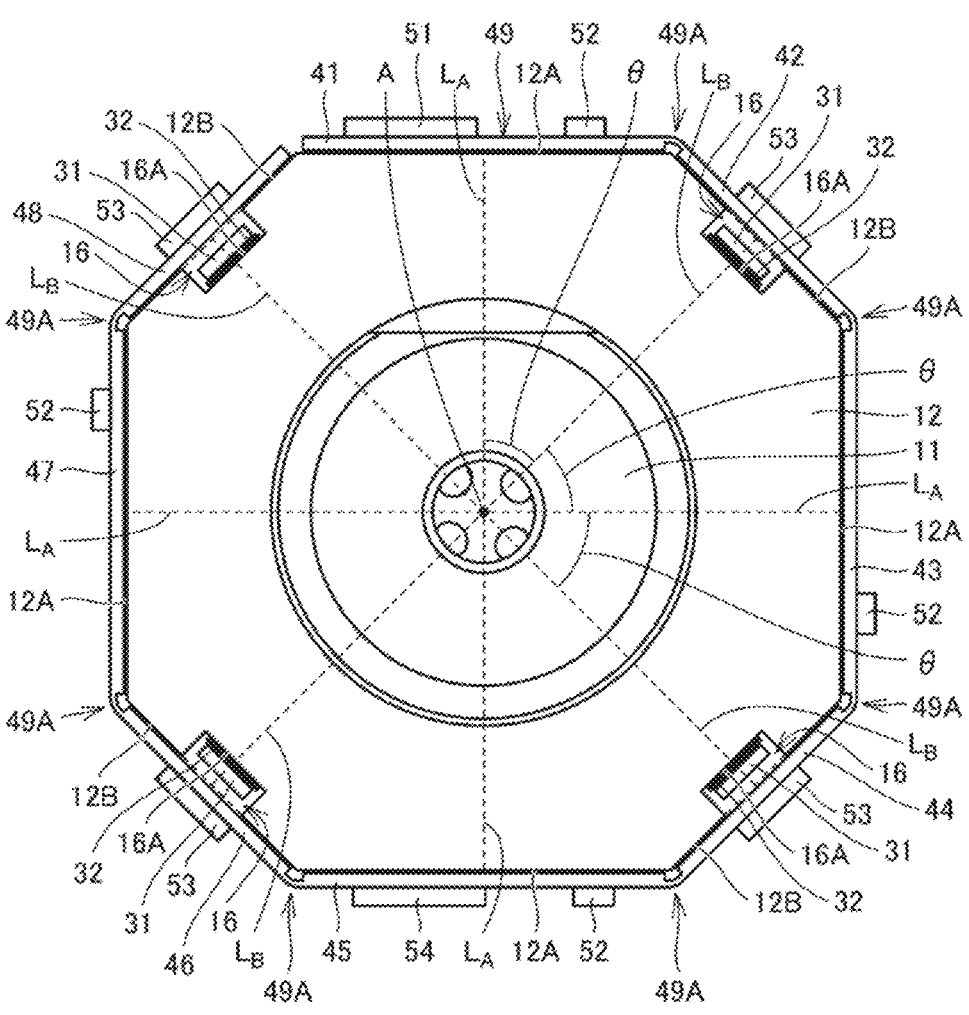
FIG. 12 is a schematic plan view showing the substrate module attached to the shaft.

Referring to FIGS. 8 and 12, substrate module 40 is wound around increased-diameter portion 12 such that the main surface of substrate 49 is in contact with outer peripheral surfaces 12A and 12B of increased-diameter portion 12, the main surface being opposite to the surface on which wireless communication unit 51, acceleration sensors 52, sockets 53, AD converter 54, and the like are mounted. At this time, first area 41, third area 43, fifth area 45, and seventh area 47 are arranged on outer peripheral surface 12A, and second area 42, fourth area 44, sixth area 46, and eighth area 48 are arranged on outer peripheral surface 12B. Substrate 49 is bent at bendable region 49A which is a groove connecting both ends in the direction in which rotation axis A extends (a groove connecting both ends in the width direction).

As a result, when viewed from a direction in which rotation axis A extends, substrate 49 is disposed along outer peripheral surfaces 12A, 12B of increased-diameter portion 12. Sockets 53 are disposed on substrate 49 disposed on outer peripheral surface 12B. Connector 33 disposed at the end of wiring line 32 connected to strain sensor 31 is connected to socket 53. Thus, substrate 49 and strain sensor 31 are electrically connected to each other. As shown in FIG. 8, wiring line 32 straddle substrate 49 in the width direction (direction in which rotation axis A extends). Wiring line 32 is warped in an arch shape. In other words, wiring line 32 connects strain sensor 31 and socket 53 with slack.

Acceleration sensor 52 is arranged on first area 41, third area 43, fifth area 45, and seventh area 47 of substrate 49. Therefore, when substrate module 40 is installed in increased-diameter portion 12 as described above, acceleration sensor 52 is arranged on each of all outer peripheral surfaces 12A (outer peripheral surfaces corresponding to the long sides) of increased-diameter portion 12, each of outer peripheral surfaces of increased-diameter portion 12 corresponding to one side of the octagon, perpendicular lines $L_A$ passing through rotation axis A and intersecting each other at 90 degrees when viewed from the direction in which rotation axis A extends. That is, strain sensor 31 and acceleration sensor 52 are arranged on outer peripheral surfaces 12A and 12B of increased-diameter portion 12 corresponding to the respective sides of the octagon different from each other.

Referring to FIG. 10, in the present embodiment, acceleration sensors 52 are arranged at a central portion in a short side direction of substrate 49 having a rectangular planar shape. As a result, referring to FIGS. 10 and 8, in the direction in which rotation axis A extends, acceleration sensors 52 and strain sensor 31 are arranged at the same position. In this way, the axial length required for arrangement of the sensor can be reduced. As a result, sensor device 20 can be reduced in size. Here, referring to FIGS. 8 and 10, the state in which "acceleration sensors 52 and strain sensor 31 are arranged at the same position in the direction in which rotation axis A extends" means that a measurement range a of acceleration sensor 52 (specifically, the range in which the electrical resistance wiring line for detecting acceleration is arranged) and a measurement range b of strain sensor 31 (specifically, the range in which the electrical resistance wiring line for detecting strain is arranged) at least partially overlap in the direction in which rotation axis A extends. The positional relationship between acceleration sensors 52 and strain sensor 31 in the direction in which rotation axis A extends may be changed in consideration of the ease of detection of acceleration and strain. For example, in the direction in which rotation axis A extends, strain sensor 31 may be arranged at a position farther from first end portion 10A (a position farther from cutting insert 91; around an upper part in FIG. 8) than acceleration sensor 52. The strain of shaft 10 caused by the cutting process increases further away from the cutting insert. The acceleration of shaft 10 caused by the cutting process is greater at a position closer to the cutting insert. Therefore, by employing such an arrangement, the sensitivity of detection of strain and acceleration by strain sensor 31 and acceleration sensor 52 is improved. On the other hand, in the direction in which rotation axis A extends, strain sensor 31 may be arranged at a position closer to first end portion 10A than acceleration sensor 52 (a position closer to cutting insert 91; around a lower part in FIG. 8). When shaft 10 is long, the strain of shaft 10 at the position where strain sensor 31 is arranged may be too large in the above arrangement. In such a case, by disposing strain sensor 31 at a position closer to first end portion 10A than acceleration sensor 52, it is possible to set the magnitude of the strain at the position where strain sensor 31 is arranged within a range in which strain sensor 31 easily detects the strain.

Referring to FIGS. 8 and 12, in the present embodiment, strain sensor 31 includes a temperature sensor. That is, in the present embodiment, a sensor in which strain sensor 31 and the temperature sensor are integrated is employed as strain sensor 31. The temperature sensor does not necessarily have to be integrated with strain sensor 31, and may be a separate body. In this case, referring to FIG. 8, the temperature sensor is arranged at the same position as strain sensor 31 in the direction in which rotation axis A extends. More specifically, referring to FIGS. 8 and 12, the temperature sensor is arranged at an arbitrary position in an annular region of outer peripheral surfaces 12A and 12B of increased-diameter portion 12 corresponding to measurement range b of strain sensor 31 in the direction in which rotation axis A extends (a band-like region of outer peripheral surfaces 12A and 12B of increased-diameter portion 12 whose width coincides with measurement range b). The temperature sensor is not essential in the cutting tool of the present disclosure, but may be employed to detect the temperature of the location where strain sensor 31 is arranged or the region corresponding to measurement range b of strain sensor 31 in outer peripheral surfaces 12A and 12B of increased-diameter portion 12. Based on the temperature detected by the temperature sensor, the thermal strain at the location where strain sensor 31 is arranged or the region corresponding to measurement range b of strain sensor 31 in outer peripheral surfaces 12A and 12B of increased-diameter portion 12 may be calculated. Thermal strain is the product of temperature change and coefficient of linear expansion. By correcting the strain detected by strain sensor 31 based on the thermal strain, the strain caused by the cutting can be more accurately ascertained.

Figure 13:
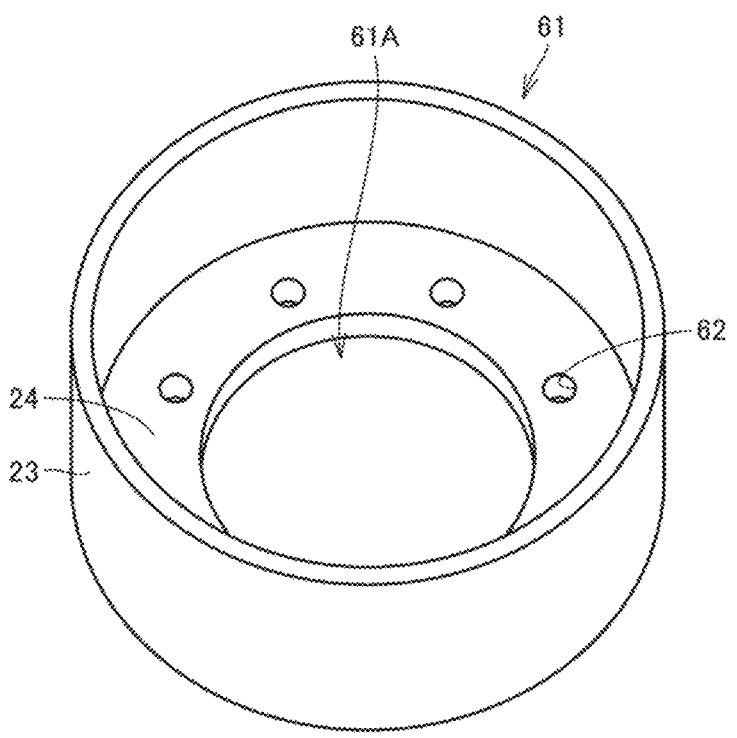
FIG. 13 is a schematic perspective view showing the structure of the housing main body.

Next, the installation of housing 21 on shaft 10 will be described. Referring to FIGS. 8 and 13 to 16, housing 21 includes a housing main body 61, a first fixing member 63, a second fixing member 65, and a lid 22. As shown in FIG. 13, housing main body 61 includes a disk-shaped bottom wall portion 24 having a through hole 61A at the center thereof, and a side wall portion 23 rising from the outer peripheral surface of bottom wall portion 24 and having a cylindrical shape. In bottom wall portion 24, a plurality of screw holes 62 (here, eight crew holes 62) penetrating bottom wall portion 24 in the thickness direction are formed at equal intervals in the circumferential direction. Housing main body 61 is made of a metal, for example. Examples of the metal that can be employed include aluminum alloy and iron alloy (steel such as stainless steel).

Figure 14:
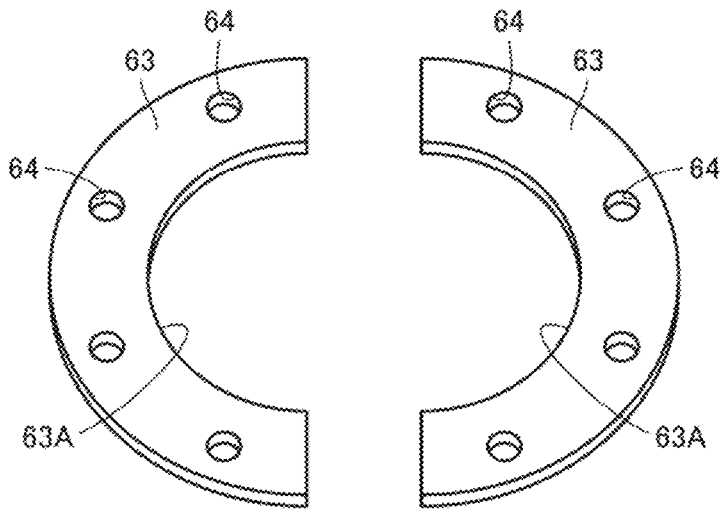
FIG. 14 is a schematic perspective view showing the structure of the first fixing member.

Referring to FIG. 14, first fixing member 63 has a shape of an annular flat plate divided into two. First fixing member 63 is formed with a plurality of screw holes 64 (here, eight screw holes 64 in total in first fixing member 63 divided into two in this case) at equal intervals in the circumferential direction so as to correspond to screw holes 62 of bottom wall portion 24 of housing main body 61. An inner peripheral surface 63A of first fixing member 63 has a shape corresponding to first small-diameter portion 11A of shaft 10. When two first fixing members 63 are assembled into an annular shape, the diameter of inner peripheral surface 63A is equal to or slightly larger than the diameter of first small-diameter portion 11A. First fixing member 63 is made of a metal, for example. Examples of the metal that can be employed include an aluminum alloy and an iron alloy (steel such as stainless steel).

Figure 15:
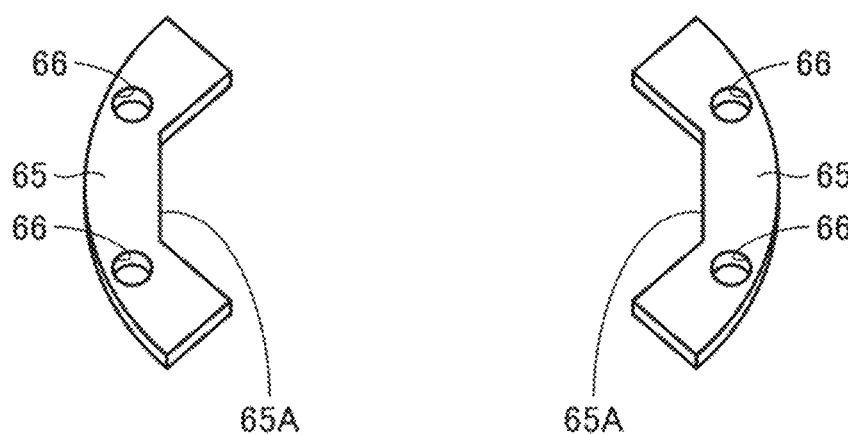
FIG. 15 is a schematic perspective view showing the structure of the second fixing member.

Referring to FIG. 15, second fixing member 65 is a part having a flat circular arc shape. In this embodiment, housing 21 includes two second fixing members 65. An inner peripheral surface 65A of each second fixing member 65 has a shape corresponding to a part of the planar shape of the outer peripheral surface of increased-diameter portion 12, i.e. a shape corresponding to a part of an octagon. A plurality of screw holes 66 (here, two screw holes 66 for each second fixing member 65) so as to correspond to screw holes 62 of bottom wall portion 24 of housing main body 61 and screw holes 64 of first fixing member 63. The material constituting second fixing member 65 is resin, for example.

Figure 16:
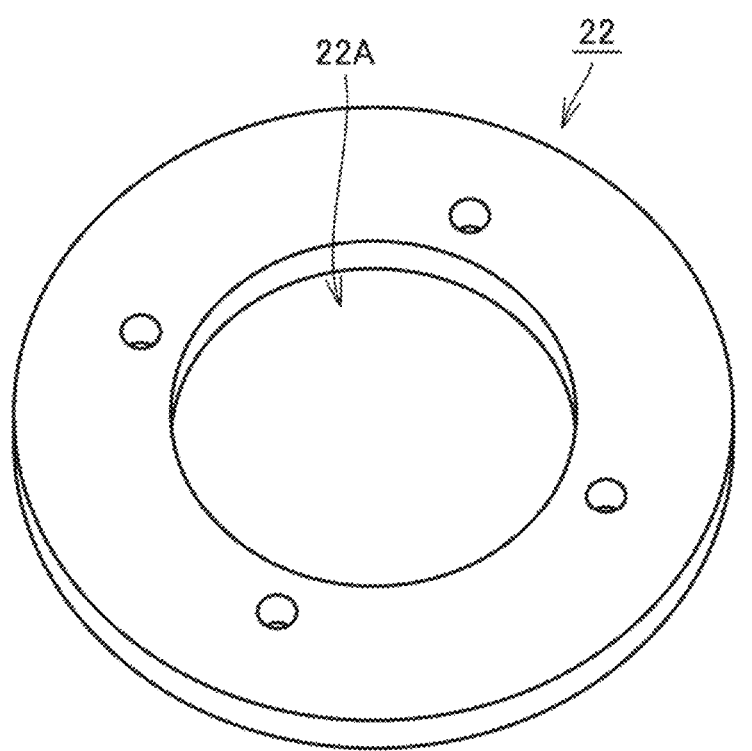
FIG. 16 is a schematic perspective view showing the structure of the lid (upper wall portion).

Referring to FIG. 16, lid (upper wall portion) 22 has a disk-like shape having a through hole 22A in the center thereof. Lid 22 is made of, for example, resin.

Housing 21 may be installed in a state in which strain sensor component 30 and substrate module 40 are installed on shaft 10. Referring to FIG. 8, housing main body 61 is disposed such that main body 11 of shaft 10 penetrating through hole 61A of bottom wall portion 24 of housing main body 61. In a state in which first fixing member 63 is disposed on bottom wall portion 24, first fixing member 63 is fitted into first small-diameter portion 11A such that inner peripheral surface 63A is in contact with the bottom wall of first small-diameter portion 11A of main body 11. In a state in which second fixing member 65 is disposed on first fixing member 63 such that inner peripheral surface 65A is in contact with outer peripheral surfaces 12A and 12B of increased-diameter portion 12. Then, housing main body 61, first fixing member 63 and second fixing member 65 are fixed to each other by a screw passing through screw hole 66 of second fixing member 65 and screw hole 64 of first fixing member 63 and reaching screw hole 62 of bottom wall portion 24. At this time, since the inner diameter of first fixing member 63 corresponds to the outer diameter of first small-diameter portion 11A, the central axis of housing main body 61 coincides with rotation axis A. In addition, since inner peripheral surface 65A of second fixing member 65 has a shape corresponding to a part of the planar shape of the outer peripheral surface of increased-diameter portion 12 (a shape corresponding to a part of an octagon), housing main body 61 is prevented from rotating in the circumferential direction relative to shaft 10. Lid (upper wall portion) 22 is fixed to increased-diameter portion 12 by a screw or the like, for example, in a state of being placed on an end surface of side wall portion 23 and an end surface of increased-diameter portion 12. In this way, housing 21 is fixed to shaft 10 in a state where sensor module 80 is accommodated therein.

(Operation of Cutting Tool)

During operation of cutting tool 1, cutting tool 1 rotates about rotation axis A. As cutting insert 91 comes into contact with the workpiece, the workpiece is machined. At this time, strain and acceleration of shaft 10 are detected by strain sensor 31 and acceleration sensor 52, respectively. The strain and acceleration information, which is an analog signal, is converted into a digital signal by AD converter 54, and then transmitted to the outside by wireless communication unit 51. Here, since lid (upper wall portion) 22 of housing 21 is made of resin, wireless communication unit 51 can transmit a signal to the outside through lid (upper wall portion) 22. This signal is externally received and analyzed to ascertain the state of shaft 10 in a plane perpendicular to the rotation axis.

Effects of Present Embodiment

In cutting tool 1 according to the present embodiment, the region of shaft 10 surrounded by sensor device 20 includes increased-diameter portion 12 having an octagonal shape when viewed from the direction in which rotation axis A extends. A plurality of strain sensors 31 for detecting strain are arranged on outer peripheral surfaces 12B of increased-diameter portion 12, each of outer peripheral surfaces 12A and 12B of increased-diameter portion 12 corresponding to one side of the octagon, perpendicular lines $L_B$ passing through rotation axis A and intersecting each other at 90 degrees. In this way, the sensors for detecting strain are arranged with a phase difference of 90 degrees in the rotation around rotation axis A. As a result, it is possible to appropriately ascertain the strain in the plane perpendicular to rotation axis A. The strain ascertained in this way is useful for ascertaining the state of cutting tool 1 during machining. As described above, cutting tool 1 of the present embodiment is a cutting tool capable of obtaining more useful data by the sensor.

In the present embodiment, when viewed from the direction in which rotation axis A extends, the angles formed by perpendicular lines $L_A$ and $L_B$ of pairs of outer peripheral surfaces 12A and 12B of the increased-diameter portion 12 are equal to each other, perpendicular lines $L_A$ and $L_B$ passing through rotation axis A, and each of the pairs corresponding to two sides of the octagon that are adjacent to each other in the circumferential direction. As a result, the symmetry of outer peripheral surfaces 12A and 12B of increased-diameter portion 12 on which strain sensor 31 is arranged with respect to rotation axis A is increased.

In the present embodiment, substrate 49 is disposed along outer peripheral surfaces 12A and 12B of increased-diameter portion 12 when viewed from the direction in which rotation axis A extends. This makes it difficult for substrate module 40 to move relative to shaft 10. As a result, the accuracy of information obtained from strain sensor 31 is increased.

In the present embodiment, first recess 16 is formed in outer peripheral surface 12B of increased-diameter portion 12. Strain sensor 31 is accommodated in first recess 16. This facilitates the arrangement of strain sensor 31.

Further, in the present embodiment, second recess 15 is formed in outer peripheral surfaces 12A and 12B of increased-diameter portion 12. Strain sensor 31 is arranged in such a manner as to straddle second recess 15. This makes it easy to measure the strain with high accuracy.

Further, in the present embodiment, second recess 15 is deeper than first recess 16 and overlaps with first recess 16. Thus, strain sensor 31 can be easily arranged and the strain can be easily measured with high accuracy by strain sensor 31.

Further, in the present embodiment, second recess 15 is a groove extending in the circumferential direction of increased-diameter portion 12. The first recess extends in a direction perpendicular to the second recess. Thus, strain sensor 31 can be further easily arranged and the strain can be easily measured with high accuracy by strain sensor 31.

Further, in the present embodiment, sensor module 80 includes a plurality of acceleration sensors 52 for detecting the acceleration of the shaft. Thus, two kinds of physical quantities of strain and acceleration can be ascertained at the same time.

Further, in the present embodiment, strain sensor 31 and acceleration sensor 52 are arranged on outer peripheral surfaces 12A and 12B of increased-diameter portion 12 corresponding to the respective sides of the octagon different from each other. Although it is possible to arrange strain sensor 31 and acceleration sensor 52 on same outer peripheral surfaces 12A and 12B, it is easy to arrange the sensors by arranging them on different surfaces.

Further, in the present embodiment, wiring line 32 constituting strain sensor component 30 connects the strain sensor and socket 53 with slack. This makes it easy to arrange strain sensor 31 without adjusting the length of wiring line 32.

Further, in the present embodiment, substrate 49 is bent in bendable region 49A having a smaller thickness than first area 41 on which wireless communication unit 51 is mounted and fifth area 45 on which AD converter 54 is mounted. Accordingly, substrate 49 can be easily deformed for installation while preventing wireless communication unit 51 and AD converter 54, which are relatively large components, from being peeled off or the like due to deformation of substrate 49.

Further, in the present embodiment, substrate 49 is a rigid substrate. A groove connecting both ends in the direction in which rotation axis A extends is formed in bendable region 49A of substrate 49. Thus, bendable region 49A can be easily formed.

(Modified Example of Substrate)

Figure 17:
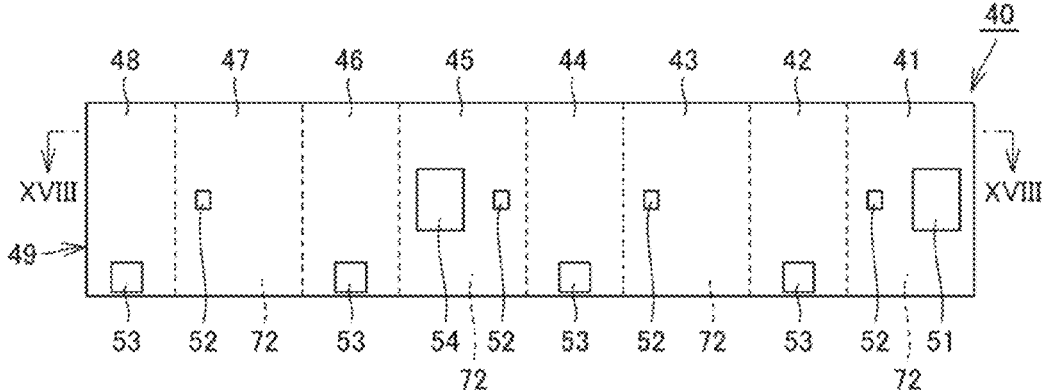
FIG. 17 is a schematic plan view showing the structure of a substrate module when a substrate of a modified example is employed.
Figure 18:
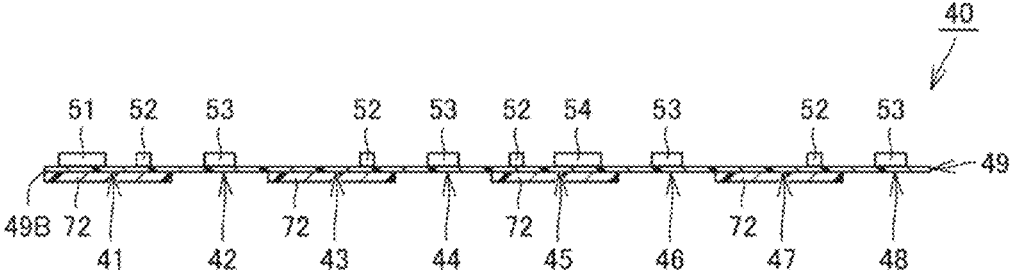
FIG. 18 is a schematic cross-sectional view showing a cross section taken along line XVIII-XVIII of FIG. 17.

Instead of substrate 49 of the above-described embodiment which is a rigid substrate, substrate 49 of a modified example described below may be employed. Referring to FIGS. 17 and 18, substrate 49 of the present modification includes a main body 49B which is a flexible substrate, and a reinforcing plate 72 which is disposed at least in first area 41 and fifth area 45 as a second area and a third area and has a Young's modulus larger than that of main body 49B. In the present modification, reinforcing plates 72 are disposed in first area 41, third area 43, fifth area 45, and seventh area 47. As described above, by employing main body 49B which is a flexible substrate and reinforcing only a necessary portion with reinforcing plate 72, it is possible to obtain the same effect as that of the above-described embodiment.

Other Modifications

In the above-described embodiment, the two types of sensors, i.e., strain sensor 31 and acceleration sensor 52, are employed as the first sensor and the second sensor, respectively. However, for example, acceleration sensor 52 as the second sensor may be omitted. In addition, strain sensor 31 may be omitted and only acceleration sensor 52 may be employed. That is, the first sensor may be an acceleration sensor. Further, a sensor that detects a physical quantity other than strain and acceleration may be employed instead of one or both of strain sensor 31 and acceleration sensor 52, or may be employed in addition to them.

In the above-described embodiment, the end mill has been described as an example of the cutting tool of the present disclosure, but the cutting tool of the present disclosure is not limited thereto. The cutting tool of the present disclosure may be, for example, a drill, a milling cutter, a boring, a reamer, a tap, etc.

In the above-described embodiment, increased-diameter portion 12 of shaft 10 disposed in the region surrounded by sensor device 20 has an octagonal shape when viewed from the direction in which rotation axis A extends. However, the planar shape of the increased-diameter portion may be a 4n-sided polygon (n is a natural number of 2 or more), and may be, for example, a dodecagon, a hexadecagon, or an icosagon.

In the above-described embodiment, strain sensor 31 is arranged on each of all of outer peripheral surfaces 12B (four surfaces) of increased-diameter portion 12, each of outer peripheral surfaces 12A and 12B of increased-diameter portion 12 corresponding to one side of the octagon, the perpendicular lines of outer peripheral surfaces 12B passing through rotation axis A and intersecting each other at 90 degrees. Strain sensor 31 may be arranged on at least two surfaces. More generally, a strain sensor is arranged on each of a set of a total of two outer peripheral surfaces, which are a first outer peripheral surface and a second outer peripheral surface of which perpendicular lines pass through the rotation axis and intersect each other at 90 degrees, or arranged on each of a set of outer peripheral surfaces, which are the two outer peripheral surfaces and a third outer peripheral surface, the perpendicular line of the third outer peripheral surface passing through the rotation axis and intersecting the perpendicular line of the first outer peripheral surface at 180 degrees. By arranging strain sensors on the first outer peripheral surface and the second outer peripheral surface of which perpendicular lines pass through the rotation axis and intersect each other at 90 degrees, information on the magnitude and the direction of a load acting in a plane perpendicular to the rotation axis can be obtained. Further, by arranging a strain sensor on the third outer peripheral surface, the influence of the load parallel to the rotation axis can be removed, and the information on the magnitude and the direction of the load acting in the plane perpendicular to the rotation axis can be obtained more accurately. There may be more than one set of outer peripheral surfaces. For example, when there are two sets of outer peripheral surfaces, a strain sensor may be arranged on each set of outer peripheral surfaces including two outer peripheral surfaces or three outer peripheral surfaces. That is, the strain sensors may be arranged on a maximum of six outer peripheral surfaces. There is no angle limit between the two sets of outer peripheral surfaces.

In the above-described embodiment, first fixing member 63 and second fixing member 65 are separate members. However, first fixing member 63 and second fixing member 65 may be integrated. In this case, first fixing member 63 and second fixing member 65 may be an integral metal member.

Other Embodiments

Figure 19:
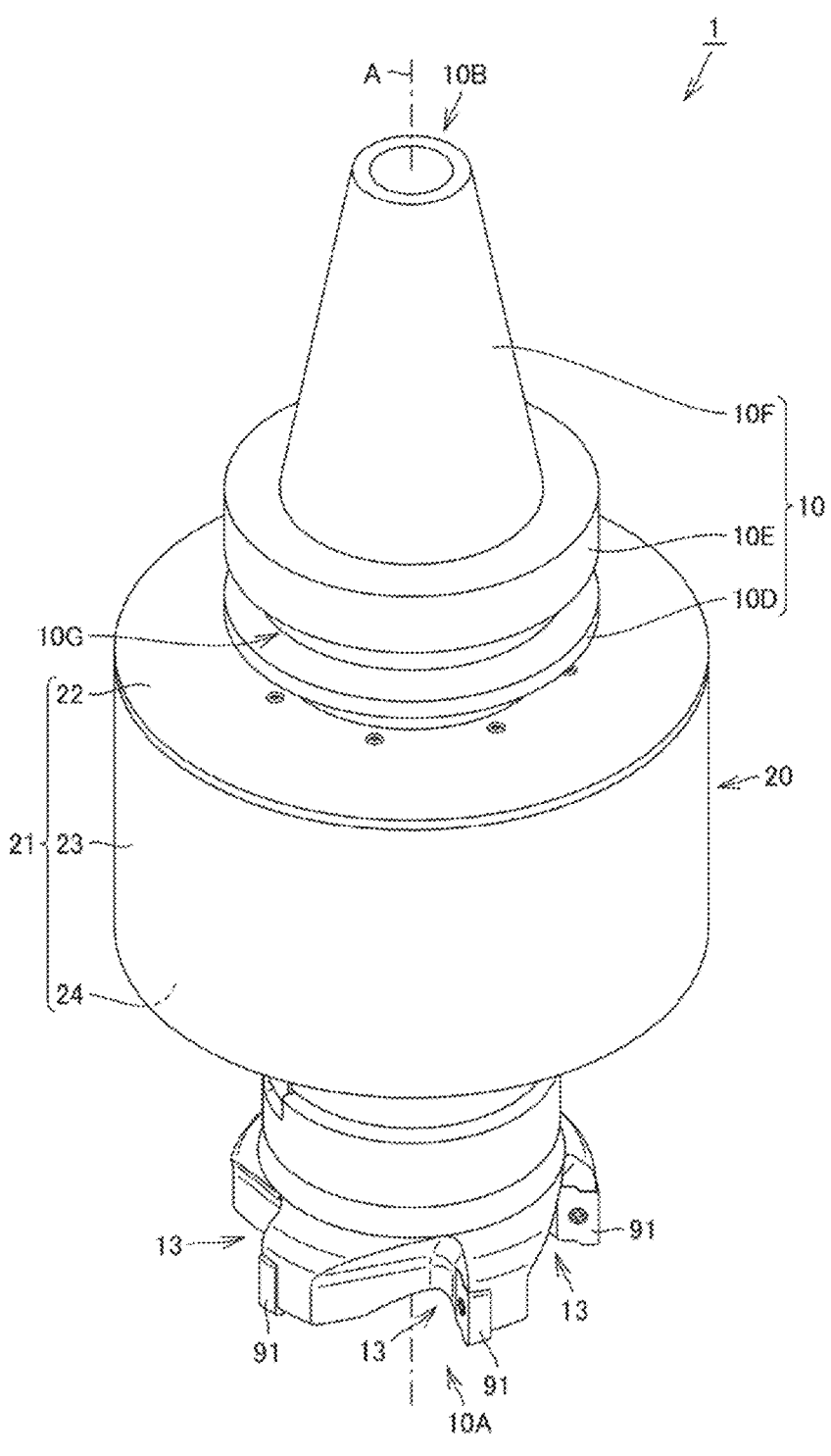
FIG. 19 is a schematic perspective view showing the construction of a cutting tool in accordance with another embodiment.

Next, other embodiments of the present disclosure will be described. FIG. 19 is a schematic perspective view showing the construction of a cutting tool in accordance with another embodiment. Referring to FIG. 19, cutting tool 1 of the present embodiment basically has the same structure as cutting tool 1 of the above-described embodiment described based on FIGS. 1 to 18, operates in the same manner, and achieves the same effects. However, cutting tool 1 of the present embodiment differs from the above-described embodiment mainly in the structure of shaft 10.

Specifically, referring to FIG. 19, shaft 10 of the present embodiment includes a annular first projecting portion 10D and a annular second projecting portion 10E projecting in a radial direction (a direction perpendicular to rotation axis A) in a region closer to second end portion 10B than to sensor device 20. Second projecting portion 10E is disposed close to second end portion 10B side than first projecting portion 10D. In the direction in which rotation axis A extends, the region between first projecting portion 10D and second projecting portion 10E of shaft 10 is a groove portion 10G. A region opposite to first projecting portion 10D when viewed from second projecting portion 10E is a tapered portion 10F having a diameter decreasing toward the second end portion. That is, shaft 10 of the present embodiment includes tapered portion 10F having a truncated cone shape.

When cutting tool 1 according to the present embodiment is in use, tapered portion 10F is inserted into a recess formed in a spindle of a machine tool, whereby cutting tool 1 is held by the spindle of the machine tool. The shapes of tapered portion 10F, first projecting portion 10D, and second projecting portion 10E can be appropriately selected in accordance with the tool holding mechanism provided in the spindle of the machine tool.

It should be understood that the embodiments disclosed herein are illustrative in all respects and are not restrictive in any respect. The scope of the present invention is defined not by the above description but by the claims, and is intended to include all modifications within the meaning and scope equivalent to the claims.

REFERENCE SIGNS LIST 1 cutting tool, 10 shaft, 10A first end portion, 10B second end portion, 10C through hole, 10D first projecting portion, 10E second projecting portion, 10F tapered portion, 11 main body, 11A first small-diameter portion, 11B second small-diameter portion, 12 increased-diameter portion, 12A outer peripheral surface, 12B outer peripheral surface, 13 recess, 15 second recess, 16 first recess, 16A bottom surface, 20 sensor device, 21 housing, 22 lid, 22A through hole, 23 side wall portion, 24 bottom wall portion, 30 sensor component, 31 strain sensor, 32 wiring line, 33 connector, 40 substrate module, 41 first area, 42 second area, 43 third area, 44 fourth area, 45 fifth area, 46 sixth area, 47 seventh area, 48 eighth area, 49 substrate, 49A bendable region, 49B main body, 51 wireless communication unit, 52 acceleration sensor, 53 socket, 54 AD converter, 61 housing main body, 61A through hole, 62 screw hole, 63 first fixing member, 63A inner peripheral surface, 64 screw hole, 65 second fixing member, 65A inner peripheral surface, 66 screw hole, 72 reinforcing plate, 80 sensor module, 91 cutting insert, 92 screw, A rotation axis, $L_A$, $L_B$ perpendicular line, $\theta$ angle, $d_1$, $d_2$ depth, a, b measurement range

The invention claimed is:

1. A cutting tool comprising:
   a shaft extending along a rotation axis and having a first end portion and a second end portion; and
   a sensor device disposed in such a manner as to surround a portion of the shaft in a longitudinal direction of the shaft,
   wherein the cutting tool is configured to cut a workpiece by rotating around the rotation axis of the shaft,
   wherein the sensor device includes
      a sensor module including a plurality of first sensors configured to detect a first physical quantity of the shaft, a substrate electrically connected to the first sensors, and a wireless communication unit electrically connected to the substrate and configured to transmit a signal including information of the first physical quantity detected by the first sensors to outside and
      a housing accommodating the sensor module,
   wherein a region of the shaft surrounded by the sensor device includes a first region having a shape of a 4n-sided polygon when viewed from a direction in which the rotation axis extends,
   wherein the n is a natural number of two or more, and
   wherein, when viewed from the direction in which the rotation axis extends, the plurality of first sensors are arranged on at least two of outer peripheral surfaces of the first region, each of outer peripheral surfaces of the first region corresponding to one of sides of the 4n-sided polygon, perpendicular lines of the at least two outer peripheral surfaces passing through the rotation axis and intersecting each other at 90 degrees.

2. The cutting tool according to claim 1,
   wherein, when viewed from the direction in which the rotation axis extends, angles formed by perpendicular lines of pairs of the outer peripheral surfaces of the first region, the perpendicular lines passing through the rotation axis, and each of the pairs corresponding to two of the sides of the 4n-sided polygon that are adjacent to each other in a circumferential direction, are equal to each other.

3. The cutting tool according to claim 1,
   wherein the substrate is disposed in such a manner as to extend along the outer peripheral surfaces of the first region corresponding to a plurality of sides of a 4n-sided polygon when viewed from the direction in which the rotation axis extends.

4. The cutting tool according to claim 3,
   wherein a first recess is formed in an outer peripheral surface of the shaft, and
   wherein each of the first sensors is accommodated in the first recess.

5. The cutting tool according to claim 3,
   wherein the first sensors are strain sensors,
   wherein an outer peripheral surface of the shaft has a first recess and a second recess, the second recess being deeper than the first recess and overlapping the first recess, and
   wherein each of the first sensors is arranged in such a manner as to straddle the second recess and accommodated in the first recess.

6. The cutting tool according to claim 5,
   wherein the second recess is a groove extending in a circumferential direction of the shaft, and
   wherein the first recess extends in direction perpendicular to the second recess.

7. The cutting tool according to claim 1,
   wherein the first sensors are strain sensors.

8. The cutting tool according to claim 7,
   wherein a second recess is formed in an outer peripheral surface of the shaft, and
   wherein each of the first sensors is arranged in such a manner as to straddle the second recess.

9. The cutting tool according to claim 1,
   wherein the first sensors are acceleration sensors.

10. The cutting tool according to claim 1,
   wherein the sensor module further includes a plurality of second sensors configured to detect a second physical quantity of the shaft different from the first physical quantity of the shaft,
   wherein the substrate is electrically connected to the second sensors, and
   wherein the wireless communication unit is electrically connected to the substrate and configured to transmit a signal including information of the second physical quantity detected by the second sensors to outside.

11. The cutting tool according to claim 10,
   wherein the first sensors are strain sensors configured to detect strain as the first physical quantity, and
   wherein the second sensors are acceleration sensors configured to detect acceleration as the second physical quantity.

12. The cutting tool according to claim 10,
   wherein the first sensors and the second sensors are arranged on the outer peripheral surfaces of the first region, and the outer peripheral surfaces on which the first sensors are arranged correspond to the sides of the 4n-sided polygon different from the sides of the 4n-sided polygon that the outer peripheral surfaces on which the second sensors are arranged.

13. The cutting tool according to claim 1,
   wherein the sensor module further includes a wiring line connected to the first sensor, and wherein the wiring line is configured to connect the first sensors to the substrate with slack in the wiring line.

14. The cutting tool according to claim 1, wherein the sensor module further includes an AD converter disposed on the substrate, and wherein, in a fourth region that is different from a second region in which the wireless communication unit is placed and a third region in which the AD converter is placed, a thickness of the substrate is smaller than a thickness of the substrate in the second region and smaller than a thickness of the substrate in the third region, the substrate being bent in the fourth region.

15. The cutting tool according to claim 14, wherein the substrate is a rigid substrate, and wherein a groove is formed in the fourth region of the substrate, the groove connecting both ends of the substrate in the direction in which the rotation axis extends.

16. The cutting tool according to claim 14, wherein the substrate includes a main body being a flexible substrate and reinforcing plates arranged in the second region and the third region, each of the reinforcing plates having a Young's modulus higher than a Young's modulus of the main body.

\* \* \* \* \*